(12) United States Patent
Han et al.

(10) Patent No.: US 11,644,139 B2
(45) Date of Patent: May 9, 2023

(54) FEMALE CONNECTOR AND CONNECTOR ASSEMBLY

(71) Applicant: ILLINOIS TOOL WORKS INC., Glenview, IL (US)

(72) Inventors: Zhiming Han, Shanghai (CN); Yue Gu, Shanghai (CN)

(73) Assignee: ILLINOIS TOOL WORKS INC., Glenview, IL (US)

( * ) Notice: Subject to any disclaimer, the term of this patent is extended or adjusted under 35 U.S.C. 154(b) by 70 days.

(21) Appl. No.: 17/237,939

(22) Filed: Apr. 22, 2021

(65) Prior Publication Data

US 2021/0332923 A1   Oct. 28, 2021

(30) Foreign Application Priority Data

Apr. 27, 2020  (CN) .......................... 202010344642.9
Apr. 9, 2021   (CN) .......................... 202110381521.6

(51) Int. Cl.
*F16L 37/12* (2006.01)
*F16L 37/14* (2006.01)
(Continued)

(52) U.S. Cl.
CPC ......... *F16L 37/1225* (2013.01); *F16L 37/144* (2013.01); *F16L 43/008* (2013.01); *F16L 33/035* (2013.01); *F16L 2201/10* (2013.01)

(58) Field of Classification Search
CPC ... F16L 37/1225; F16L 33/035; F16L 43/008; F16L 37/144; F16L 37/142
See application file for complete search history.

(56) References Cited

U.S. PATENT DOCUMENTS 3,527,485 A * 9/1970 Harold ................... F16L 37/144
                                                285/305
5,341,773 A * 8/1994 Schulte ............ F02M 35/10321
                                                285/305
(Continued)

FOREIGN PATENT DOCUMENTS

CN    110043731 A      7/2019
DE    202020101638 U1  4/2020
WO    2018/102213 A1   6/2018

OTHER PUBLICATIONS

Extended European Search Report for European Patent Application No. 21169484.9, dated Sep. 14, 2021 (8 pages).

*Primary Examiner* — Zachary T Dragicevich
*Assistant Examiner* — James A Linford
(74) *Attorney, Agent, or Firm* — Quarles & Brady LLP

(57) ABSTRACT

A female connector for receiving a male connector includes a housing, a support ring, a clip, and a clip blocking member. The male connector includes a groove. The housing includes an outer surface and housing openings. The support ring includes support ring openings. The clip includes an operation portion between a pair of clip legs. The pair of clip legs can pass through the housing and support ring openings. The clip blocking member is located outside the housing and has a pair of blocking faces which face the pair of clip legs. When the groove aligns with the housing and support ring openings, the pair of clip legs enter the groove, and the operation portion moves to a travel end position. In the travel position, the distal ends of the pair of clip legs are between the pair of blocking faces and the outer surface.

20 Claims, 7 Drawing Sheets

(51) Int. Cl.
*F16L 43/00* (2006.01)
*F16L 33/035* (2006.01)

(56) References Cited

U.S. PATENT DOCUMENTS

| | | | | |
|---|---|---|---|---|
| 7,438,328 B2 * | 10/2008 | Mori | ................ | F02M 35/10144 |
| | | | | 285/305 |
| 2004/0178629 A1 * | 9/2004 | Yoshida | .............. | F16L 37/0885 |
| | | | | 285/305 |
| 2008/0279621 A1 | 11/2008 | Chaupin | | |
| 2019/0390808 A1 * | 12/2019 | Trotter | .................. | F16L 37/101 |

* cited by examiner

FEMALE CONNECTOR AND CONNECTOR ASSEMBLY

CROSS REFERENCE TO RELATED APPLICATIONS

This application is based on, claims priority to, and incorporates herein by reference in their entireties Chinese Patent Application No. 202010344642.9, filed on Apr. 27, 2020, and entitled "Joint Assembly", and Chinese Patent Application No. 202110381521.6, filed on Apr. 9, 2021, and entitled "Female Connector and Connector Assembly".

TECHNICAL FIELD

The present disclosure relates to the technical field of connector assemblies, and more specifically to a connector assembly of a quick-insertion connector type and a female connector thereof.

BACKGROUND

A connector assembly of a quick-insertion connector type is a connector that can achieve pipeline connection or disconnection without tools. The connector assembly of a quick connector type generally comprises a male connector and a female connector, which are respectively connected to two pipes to be connected. A user can directly insert the male connector into the female connector without external tools to achieve the assembly connection between the male connector and the female connector so as to allow fluid to flow through the pipeline of the connector assembly, such that the two pipes to be connected are in communication and connection by means of the connector assembly.

SUMMARY OF THE DISCLOSURE

One of the objectives of the present disclosure is to provide a female connector, which can achieve an effective connection between a male connector and a female connector by means of a clip, preventing the male connector and the female connector from not being mounted in place.

According to a first aspect of the present disclosure, the present disclosure provides a female connector for receiving a male connector, which comprises an outer surface and a groove that is recessed inwards from the outer surface and extends in the circumferential direction. The female connector comprises: a female connector housing defining a fluid channel that extends in the axial direction thereof and comprising a pair of housing openings, the pair of housing openings extending in the circumferential direction of the female connector housing and being in communication with the fluid channel; a support ring comprising a pair of support ring openings, the pair of support ring openings extending in the circumferential direction of the support ring and being in communication with the internal space of the support ring, the support ring being arranged in a fluid channel of the female connector housing, the pair of support ring openings being respectively aligned with the pair of housing openings; a clip comprising a pair of clip legs and an operation portion connected between proximal ends of the pair of clip legs, and the pair of clip legs being configured to respectively pass through the pair of housing openings and enter the pair of support ring openings; and a clip blocking member being located outside the female connector housing, and having a pair of blocking faces, which respectively face distal ends of the two clip legs of the clip. The male connector can be at least partially inserted into the internal space of a support ring located in a fluid channel of the female connector. Also, when the groove of the male connector is aligned with the pair of housing openings and the pair of support ring openings, the pair of clip legs enter the groove, and the operation portion of the clip is capable of getting into a travel end position. The pair of blocking faces are configured such that, when the groove is not aligned with the pair of housing openings and the pair of support ring openings, and the pair of clip legs abut against the outer surface of the male connector, the pair of blocking faces prevent the operation portion from getting into the travel end position by abutting against the distal ends of the pair of clip legs.

According to the foregoing female connector, an operator determines, according to the fact that the operation portion reaches the travel end position, that the clip locks the male connector with respect to the female connector and, when the clip locks the male connector with respect to the female connector, the clip is in a locked position.

According to the foregoing female connector, the outer surface of the female connector housing is provided with a mounting indicator, and the operator determines, according to the position of the operation portion with respect to the mounting indicator, whether the operation portion reaches the travel end position.

According to the foregoing female connector, when the clip is in the locked position, there is a first predetermined distance between the distal ends of the pair of clip legs, and the pair of blocking faces are configured such that, when the distance between the distal ends of the two clip legs is greater than the first predetermined distance, the pair of blocking faces are capable of abutting against the distal ends of the two clip legs so as to prevent the operation portion of the clip from reaching the travel end position.

According to the foregoing female connector, the clip blocking member is connected to the support ring, and the pair of blocking faces are spaced from the outer surface of the female connector housing to accommodate the distal ends of the two clip legs.

According to the foregoing female connector, the female connector housing is cylindrical, the pair of blocking faces are arc faces parallel to the outer surface of the female connector housing, there is a second predetermined distance between the pair of blocking faces and the outer surface of the female connector housing, and the second predetermined distance is determined according to the length of the distal ends of the pair of clip legs extending for from the outer surface of the female connector housing when the clip is in the locked position.

According to the foregoing female connector, the clip blocking member comprises a pair of blocking portions, and the pair of blocking faces are respectively formed on the pair of blocking portions.

According to the foregoing female connector, the pair of blocking portions respectively comprise an arc-shaped blocking plate that is arranged concentrically with the female connector housing, and the pair of blocking faces are formed by the blocking plates.

According to the foregoing female connector, the distal ends of the pair of clip legs respectively form a foot, and the feet are configured to hold the distal ends of the pair of clip legs outside the female connector housing.

According to the foregoing female connector, the female connector further comprises a sealing ring, the sealing ring is arranged in the fluid channel of the female connector housing and is located at the inner side of the support ring in the axial direction of the female connector housing, the sealing ring is configured such that the male connector is connected to the female connector in a sealing manner, and the support ring is configured to hold the sealing ring in the fluid channel.

According to a second aspect of the present disclosure, the present disclosure further provides a connector assembly, comprising a male connector, which comprises an outer surface and a groove that is recessed inwards from the outer surface and extends in the circumferential direction; and the female connector according to the first aspect.

According to the connector assembly of the present disclosure, the cooperation of the clip and the clip blocking member prevents the operation portion of the clip from reaching the travel end position when the male connector is not inserted in place in the female connector, so as to prevent the operator from determining by mistake, according to the fact that the operation portion of the clip reaches the travel end position, that the male connector has been inserted in place in the female connector.

DETAILED DESCRIPTION OF EMBODIMENTS

Various specific embodiments of the present disclosure are described below with reference to the accompanying drawings which constitute a part of this description. It is to be understood that although the terms indicating orientations, such as "front", "rear", "upper", "lower", "left", "right", "top" and "bottom", are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are only illustrative and should not be considered as limitations.

Figure 1A:
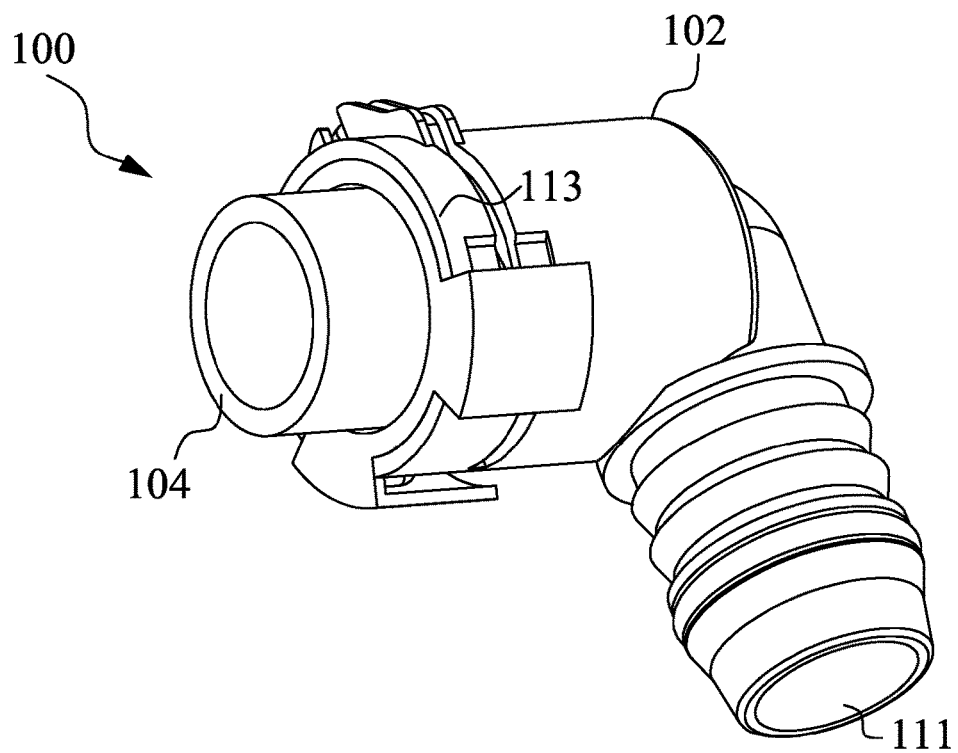
FIG. 1A is a perspective view of a connector assembly that uses a female connector according to one embodiment of the present disclosure.
Figure 1B:
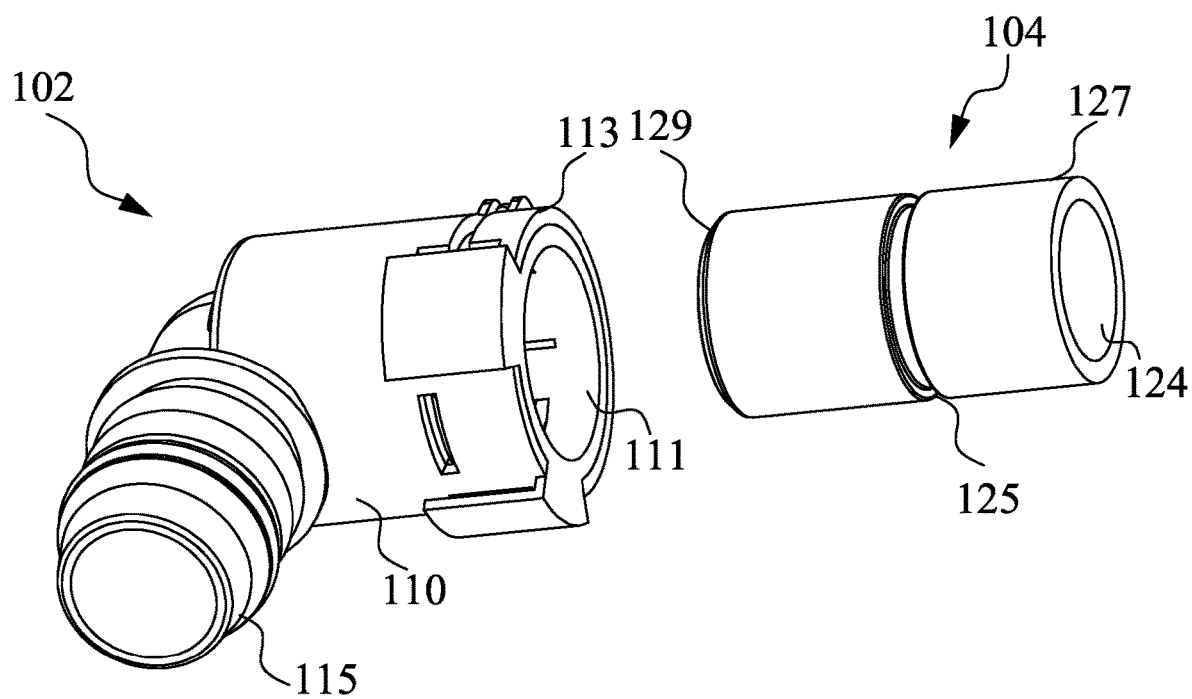
FIG. 1B is a partial exploded view of the connector assembly in FIG. 1A.

FIG. 1A is a perspective view of a connector assembly 100 that uses a female connector 102 according to one embodiment of the present disclosure, and FIG. 1B is a partial exploded view of the connector assembly 100 in FIG. 1A with a male connector 104 being separated from the female connector 102. As shown in FIGS. 1A and 1B, the connector assembly 100 comprises the male connector 104 and the female connector 102. The male connector 104 is connected to the female connector 102 in an insertion manner, i.e., the male connector 104 is partially inserted into the female connector 102, so as to achieve fluid communication between the male connector 104 and the female connector 102.

The male connector 104 is substantially in the shape of a straight tube with a circular cross section, and the male connector 104 is internally provided with a male connector channel 124. The male connector channel 124 axially penetrates the male connector 104, such that when the male connector 104 is inserted inside the female connector 102, the male connector channel 124 can be in communication with the inside of the female connector 102. An outer surface 127 of the male connector 104 is provided with an inwardly recessed groove 125. The groove 125 is circular ring-shaped, and is arranged surrounding the periphery of the male connector 104. The end of the male connector 104 that is inserted into the female connector 102 is provided with a guide face 129 that is inclined relative to the axis thereof. The groove 125 is configured to receive a clip 220 (see FIG. 2C) of the female connector 102 so as to achieve fixed connection (locking) of the male connector 104 and the female connector 102, and the guide face 129 is configured to guide the male connector 104 to be inserted between the clip 220 of the female connector 102, which will be described in detail later.

The female connector 102 is substantially in the shape of a bent tube bent at 90°. In order to adapt to different application environments, in other embodiments, the female connector 102 may also be in the shape of a straight tube. The female connector 102 comprises a female connector housing 110. The female connector housing 110 has two ends, one of which is a receiving end 113, and the other of which is a fixed end 115. The inner diameter of the female connector 102 at the position of the receiving end 113 of the female connector housing 110 matches the outer diameter of the male connector 104, such that the male connector 104 can be inserted into the female connector 102. In this embodiment, the fixed end 115 of the female connector housing 110 is provided with an external thread, such that the female connector 102 can be in threaded connection with an external pipe via the fixed end 115, and in other embodiments, the fixed end 115 can also be in connection with the external pipe in other manners, such as clamp connection. The female connector housing 110 defines a fluid channel 111 that extends in the axial direction of the female connector 102. After the male connector 104 is inserted into the female connector 102, the male connector channel 124 is in communication with the fluid channel 111 of the female connector housing 110, such that the pipe to which the male connector 104 is connected can be in fluid communication with the pipe to which the female connector 102 is connected.

Figure 2A:
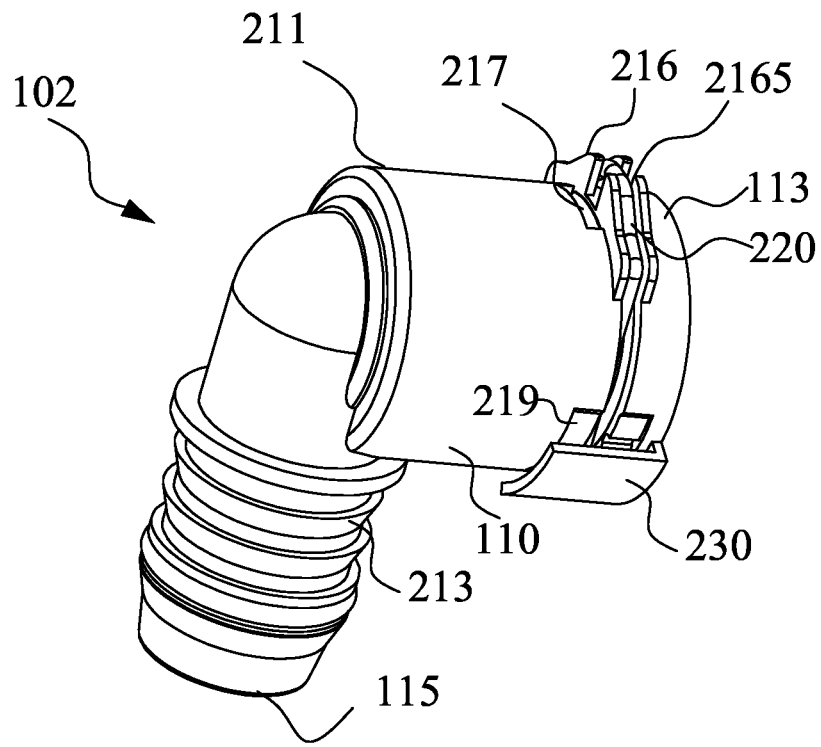
FIG. 2A is a perspective view of the female connector shown in FIG. 1B from a first perspective.
Figure 2B:
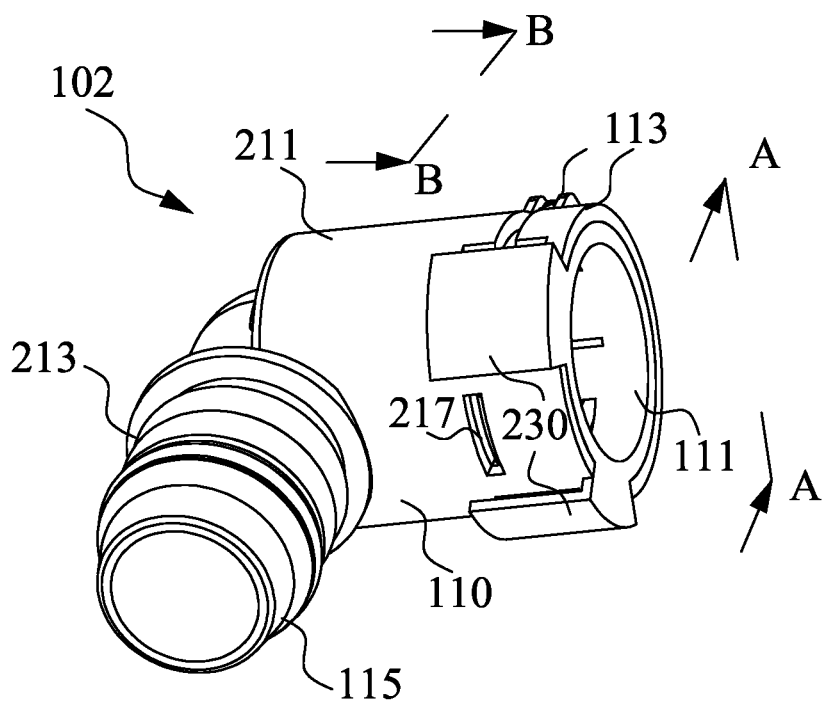
FIG. 2B is a perspective view of the female connector shown in FIG. 1B from a second perspective.
Figure 2C:
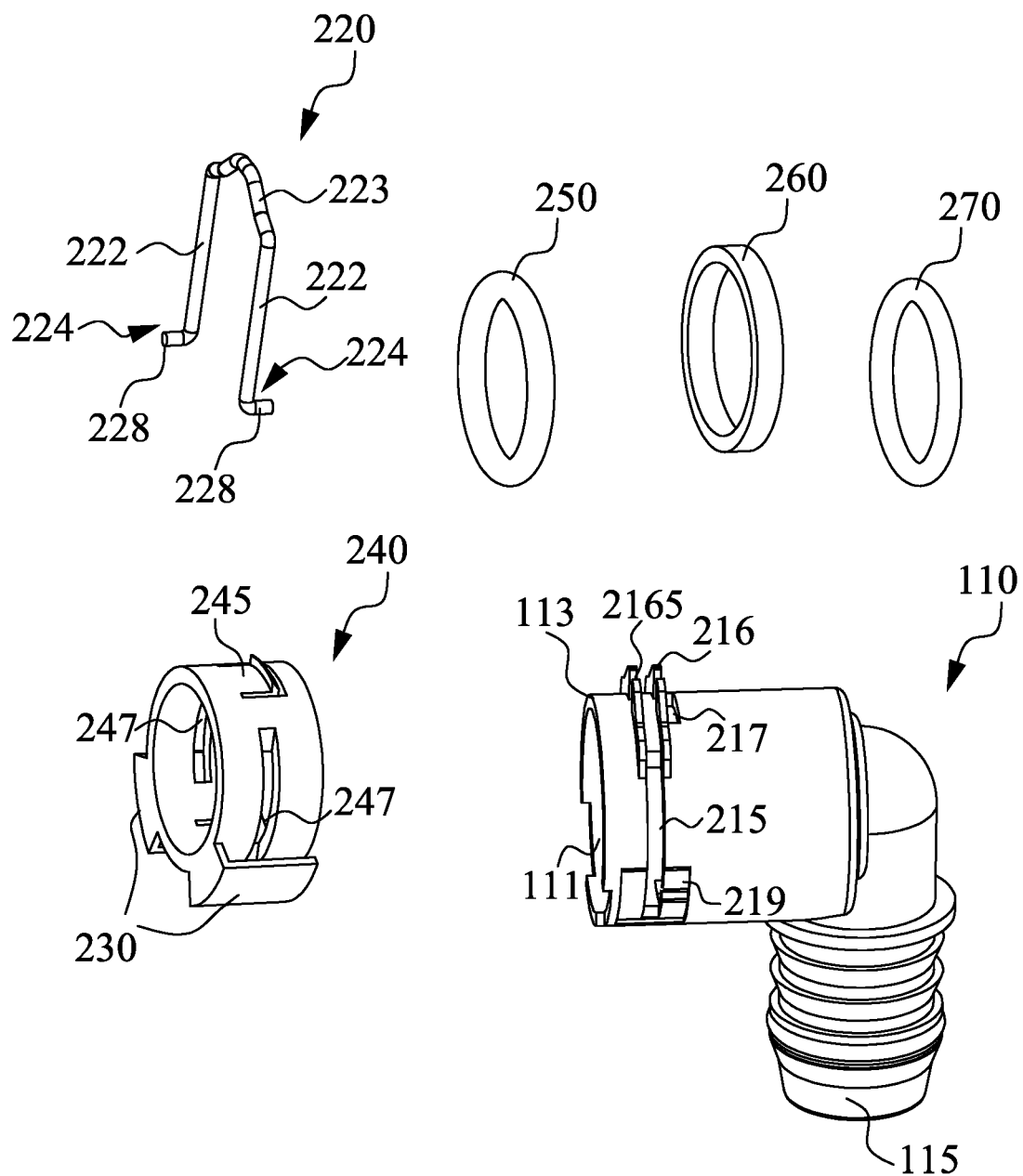
FIG. 2C is an exploded view of the female connector shown in FIG. 1B.

FIGS. 2A and 2B are respectively perspective views of the female connector 102 shown in FIG. 1B from two different perspectives, and FIG. 2C is an exploded view of the female connector 102 shown in FIG. 1B. As shown in FIGS. 2A-2C, the female connector 102 comprises a female connector housing 110, a clip 220 and a clip blocking member 230, as well as a support ring 240, a sealing ring 250, an additional support ring 260 and an additional sealing ring 270, which are located in the female connector housing 110.

As shown in FIGS. 2A-2C, the female connector housing 110 forms a basic structure of the female connector 102. The female connector housing 110 is substantially in the shape of a bent tube bent at 90°, and comprises a thicker first pipe section 211 and a thinner second pipe section 213, with the first pipe section 211 being connected to the second pipe section 213 at the bend. The fluid channel 111 extends through the first pipe section 211 and the second pipe section 213. The support ring 240, the sealing ring 250, the additional support ring 260 and the additional sealing ring 270 are inserted into the first pipe section 211 of the female connector housing 110. The receiving end 113 of the female connector housing 110 corresponds to the free end of the first pipe section 211, and the fixed end 115 corresponds to the free end of the second pipe section 213.

As shown in FIG. 2C, the support ring 240, the sealing ring 250, the additional support ring 260 and the additional sealing ring 270 are all ring-shaped, with outer diameters thereof respectively matching inner diameters of the first pipe section 211 of the female connector housing 110 at mounting positions. The support ring 240, the sealing ring 250, the additional support ring 260 and the additional sealing ring 270 are inserted from the receiving end 113 into the first pipe section 211 of the female connector housing 110, and are sequentially arranged in the first pipe section 211 from the outside to the inside. The sealing ring 250 and the additional sealing ring 270 are made of an elastic material to achieve sealing connection between the male connector 104 and the female connector 102 to prevent the fluid that circulates in the connector assembly 100 from leaking outwards. The support ring 240 is configured to define the axial position of the sealing ring 250 in the female connector housing 110, and the additional support ring 260 is configured to define the axial position of the additional sealing ring 270 in the female connector housing 110. In order to ensure the sealing effect between the male connector 104 and the female connector 102, the female connector 102 of this embodiment is provided, in the female connector housing 110, with two sealing devices, i.e., the sealing ring 250 and the additional sealing ring 270, and in other embodiments, the female connector 102 can also be internally provided with only one sealing device. For the other embodiments of the female connector 102 provided with only one sealing device, the additional sealing ring 270 and the additional support ring 260 are omitted on the basis of the female connector 102 of this embodiment.

As shown in FIGS. 2A and 2C, the clip 220 is partially inserted into the female connector housing 110. The clip 220 is configured to lock the male connector 104 with respect to the female connector 102 when the male connector 104 is inserted into the female connector 102, so as to maintain the fixed connection therebetween. The clip 220 is a long strip with multiple bends, and in this embodiment, the clip 220 is formed by bending a long strip-shaped straight rod with a circular cross section. The clip 220 comprises an operation portion 223 and a pair of clip legs 222, with the operation portion 223 being connected between the two clip legs 222. The operation portion 223 substantially extends in a horizontal direction, and the middle of the operation portion 223 protrudes upwards to facilitate the user's operation. Proximal ends of the two clip legs 222 are connected to the operation portion 223, and the two clip legs 222 respectively vertically extend downwards from two ends of the operation portion 223 to realize the snap-fitting between the male connector 104 and the female connector 102. The two clip legs 222 extend for substantially the same lengths, and the center line of the operation portion 223 and the center lines of the two clip legs 222 are substantially on the same plane. Distal ends 224 of the two clip legs 222 bend to form feet 228, and the two feet 228 respectively bend from the two clip legs 222 towards two different directions. The feet 228 are provided to facilitate the connection of the clip 220 to the female connector housing 110, such that the clip 220 is not easy to be detached from the female connector housing 110. In this embodiment, the two feet 228 extend in directions which are both perpendicular to the plane where the center line of the operation portion 223 and the center lines of the clip legs 222 are located. That is, the two feet 228 are parallel to each other, and extend in opposite directions. It should be noted that although in this embodiment the distal ends 224 of the two clip legs 222 are bent to form the feet 228, in other embodiments, the distal ends 224 of the two clip legs 222 may not be bent to form the feet, which are all in the protection scope of the present disclosure. The clip 220 is made of a metal material (such as, stainless steel) with certain rigidity. Since the clip 220 is in the shape of an elongate strip, the two clip legs 222 have elasticity relative to each other. That is, the two clip legs 222 can move towards or away from each other, such that the clip 220 is contracted or deployed. When the clip 220 is in a free state, the two clip legs 222 are substantially parallel to each other.

As shown in FIGS. 2A-2C, the clip blocking member 230 is located at the outer side of the female connector housing 110 to restrict the motion path of the clip 220. In this embodiment, the clip blocking member 230 is integrally connected to the support ring 240. The support ring 240 is at the position of the female connector housing 110 close to the receiving end 113, the clip blocking member 230 extends out of the fluid channel 111 of the female connector housing 110 from the receiving end 113, and extends to the outer side of the female connector housing 110. In other embodiments, the clip blocking member 230 may also be directly connected to the outer surface of the female connector housing 110.

As shown in FIG. 2C, the support ring 240 is of a ring structure, and extends for a certain length in the axial direction thereof. The support ring 240 is provided with a pair of mounting members 245 for fixed connection of the support ring 240 and the female connector housing 110, and a pair of support ring openings 247 that allow the two clip legs 222 to enter the internal space of the support ring 240. The pair of mounting members 245 are respectively located at the top and the bottom of the support ring 240. The support ring openings 247 penetrate the support ring. The support ring openings 247 are elongated, and extend in the circumferential direction of the support ring 240. The mounting members 245 and the support ring openings 247 are arranged at intervals in the circumferential direction of the support ring 240.

As shown in FIGS. 2A-2C, the female connector housing 110 is provided with a pair of housing openings 215 at the position of the receiving end 113, and the housing openings 215 radially penetrate the female connector housing 110. The housing openings 215 are elongated, and extend in the circumferential direction of the female connector housing 110. When the support ring 240 is mounted in place in the female connector housing 110, the pair of support ring openings 247 are respectively aligned with the pair of housing openings 215, such that the clip legs 222 of the clip 220 can sequentially pass through the housing openings 215 and the support ring openings 247 to enter the inside of the support ring 240, and cooperate with the groove 125 in the male connector 104 inserted into the support ring 240 such that the male connector 104 is fixedly connected to the female connector 102 to lock the male connector 104 with respect to the female connector 102. The female connector housing 110 is further provided with a pair of support ring mounting holes 217. The pair of support ring mounting holes 217 of the female connector housing 110 can be cooperated and snap-fitted with the pair of mounting members 245 of the support ring 240, such that the support ring 240 is fixedly connected to the female connector housing 110. The pair of support ring mounting holes 217 are respectively located at the top and the bottom of the female connector housing 110. The two support ring mounting holes 217 have the same size and shape, radially penetrate the female connector housing 110, and are symmetrically arranged with respect to the central axis of the female connector housing 110.

The outer surface of the female connector housing 110 is further provided with a pair of clip mounting slots 219 (see FIGS. 2A and 2C) for receiving the two feet 228 of the clip 220. The pair of clip mounting slots 219 have the same size and shape, and are symmetrically arranged at the lower part of the female connector housing 110. The clip mounting slots 219 each correspond to one housing opening 215, and are arranged on two sides of the housing opening 215 in the width direction. That is, each of the clip mounting slots 219 extends through the housing opening 215 in the width direction of the respective housing opening 215 (i.e., axial direction of the female connector housing 110). Since when the clip 220 is mounted on the female connector housing 110, the two feet 228 of the clip 220 extend in the axial direction of the female connector housing 110, and the clip mounting slots 219 also extend in the axial direction of the female connector housing 110, such that the pair of clip mounting slots 219 can receive the feet 228 of the clip 220.

As shown in FIGS. 2A and 2C, the outer surface of the top of the female connector housing 110 is further provided with a mounting indicator for indicating the mounting state of the clip 220 on the female connector 102. The mounting indicator comprises a pair of mounting indication plates 216. The mounting indication plates 216 can guide the mounting of the clip 220, and can also indicate the mounting state of the clip 220 on the female connector 102. The two mounting indication plates 216 have the same size and shape, and are arranged side by side in the axial direction of the female connector housing 110 and respectively located on opposite sides of the housing opening 215. The mounting indication plates 216 are arranged on a radial face of the female connector housing 110, and each of the mounting indication plates 216 has the shape of contour similar to the contour of the operation portion 223 of the clip 220. With the above configuration, an accommodation space that can accommodate the operation portion 223 of the clip 220 is formed between the two mounting indication plates 216. Each mounting indication plate 216 is provided with a notch 2165 in the middle in the direction extending in the circumferential direction of the female connector housing 110, and the notch 2165 is provided such that the user can observe the mounting state of the clip 220 from the lateral side of the female connector 102.

Figure 3:
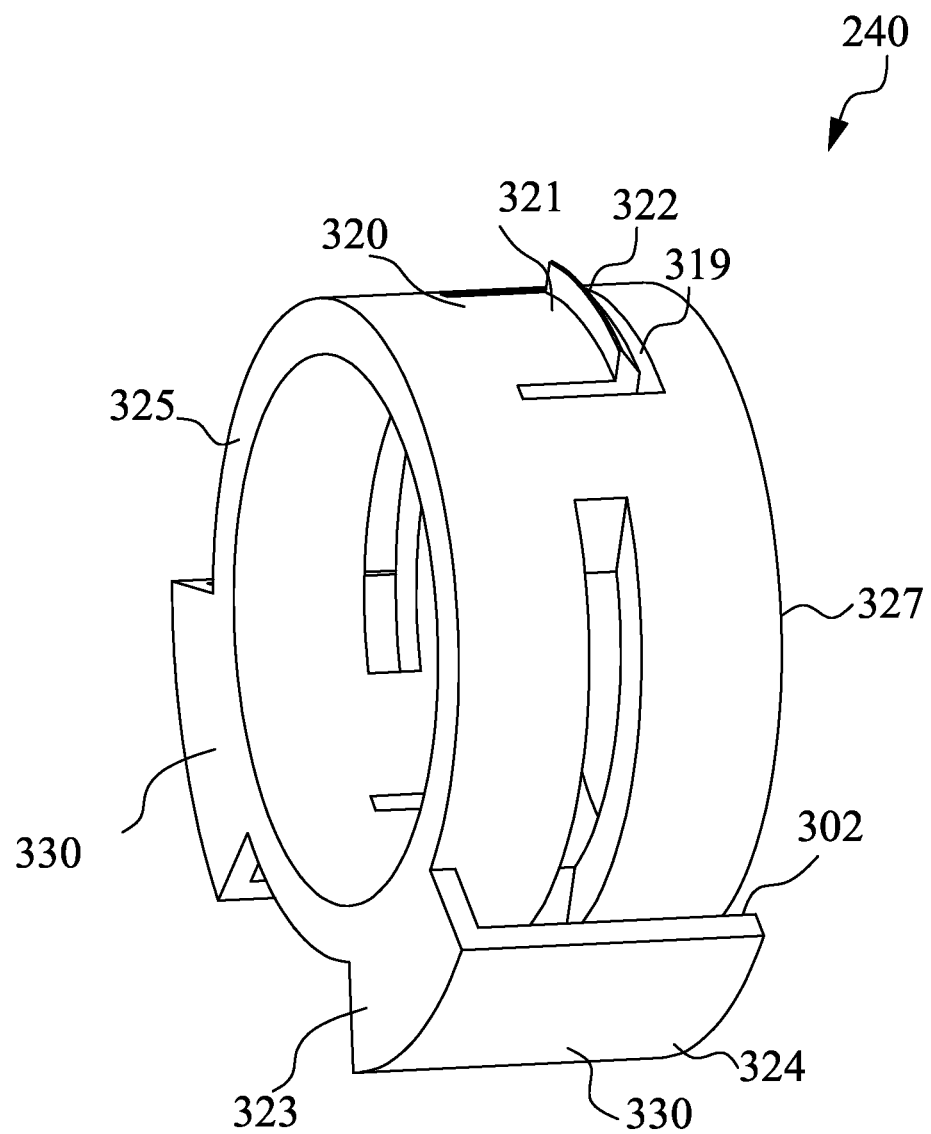
FIG. 3 is an enlarged perspective view of a support ring and a blocking member in FIG. 2C.

FIG. 3 is an enlarged perspective view of the support ring 240 and the blocking member 230 in FIG. 2C for showing the more detailed structure of the support ring 240 and the blocking member 230. As shown in FIG. 3, the support ring 240 is provided with two windows 319 at the positions of the two mounting members 245, and the two windows 319 have the same size and shape. FIG. 3 only shows one window 319 and one mounting member 245 at the top of the support ring 240, with one window 319 and one mounting member 245 at the bottom of the support ring 240 being hidden from view. The specific structure of the windows 319 and the mounting members 245 will be described below, with the window 319 and the mounting member 245 being arranged at the top of the support ring 240 as an example.

The window 319 is substantially square, and each window 319 can accommodate one mounting member 245. The window 319 penetrates the support ring 240 in thickness in the radial direction. The mounting member 245 of the support ring 240 comprises a mounting member connection end 320 and a mounting member free end 321, with the mounting member connection end 320 being connected to the edge of one side of the window 319, and the mounting member free end 321 being provided with a protrusion 322. Therefore, the mounting member 245 forms an elastic cantilever structure that can move in the window 319. When the mounting member 245 is in a free state, the protrusion 322 on the mounting member free end 321 protrudes from the outer surface of the main body of the support ring 240, and the other parts of the mounting member 245 is aligned with the outer surface of the main body of the support ring 240. When an inwards force is applied to the protrusion 322 on the mounting member free end 321, the mounting member free end 321 moves towards the inside of the support ring 240, and the protrusion 322 on the mounting member free end 321 can be completely accommodated in the window 319 and no longer protrudes from the outer surface of the main body of the support ring 240. The size and shape of the protrusions 322 of the pair of mounting members 245 on the support ring 240 respectively match the size and shape of the pair of support ring mounting holes 217 in the female connector housing 110, such that when the support ring 240 is mounted in the female connector housing 110, the pair of protrusions 322 can be respectively accommodated in the pair of support ring mounting holes 217. The two axial ends of the support ring 240 are respectively an inner end 327 and an outer end 325. When the support ring 240 is inserted into the female connector housing 110, the inner end 327 first enters the female connector housing 110, and then the outer end 325 enters the female connector housing 110, such that the inner end 327 is located at the inner side of the outer end 325.

The cooperation of the mounting members 245 of the support ring 240 and the support ring mounting holes 217 of the female connector housing 110 facilitates the fixed mounting of the support ring 240 in the female connector housing 110 to prevent the support ring 240 from shifting and deflecting in both the axial direction and the circumferential direction of the female connector housing 110. In addition, the cooperation of the mounting members 245 and the support ring mounting holes 217 can also facilitate the disassembly of the support ring 240, that is, the support ring 240 can be easily detached from the female connector housing 110 only by means of the two protrusions 322 of the pair of mounting members 245 being respectively withdrawn from the respective support ring mounting holes 217.

The blocking member 230 comprises a pair of blocking portions 330 that form a pair of blocking faces 302. FIG. 3 only clearly show one of the blocking portions 330, with the other blocking portion 330 being hidden from view. The two blocking portions 330 are symmetrically arranged on the support ring 240, and have the same structure. The blocking portion 330 comprises a connection plate 323 and a blocking plate 324. One end of the connection plate 323 is connected to the support ring 240, and extends outwards from the outer end 325 of the support ring 240 in the radial direction of the support ring 240. The other end of the connection plate 323 is connected to the blocking plate 324, and the blocking plate 324 extends from the end of the connection plate 323, towards the inner end 327 of the support ring 240, in the axial direction of the support ring 240. The blocking plates 324 of the two blocking portions 330 are respectively located at the outer sides of the pair of support ring openings 247, and are spaced from the outer surface of the support ring 240. The blocking plates 324 of the two blocking portions 330 are both in the shape of an arc-shaped plate, such that each of the blocking portions 330 has a blocking face 302 that faces the outer surface of the support ring 240, and the blocking face 302 is an arc face. In this embodiment, the clip blocking member 230 is composed of two separate blocking portions 330, and in other embodiments, the two blocking portions 330 may also be connected as a whole.

Figure 4A:
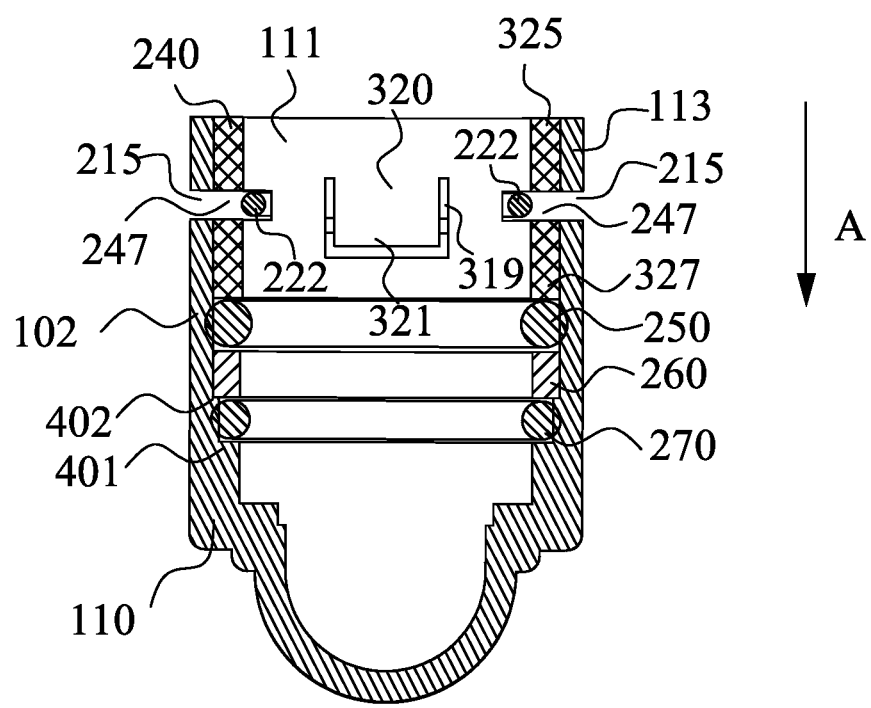
FIG. 4A is a cross-sectional view of the female connector in FIG. 2B along line A-A.
Figure 4B:
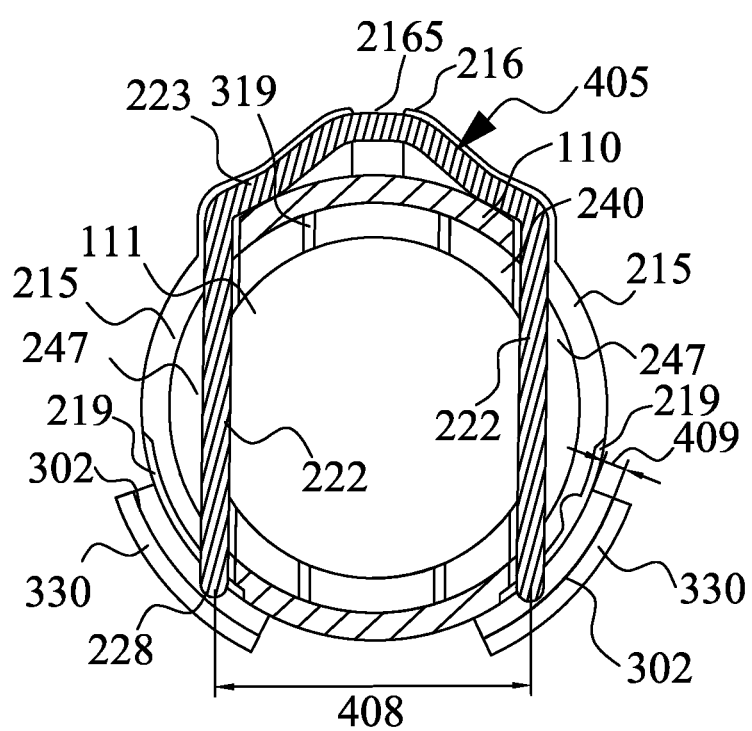
FIG. 4B is a cross-sectional view of the female connector in FIG. 2B along line B-B.

FIG. 4A is a cross-sectional view of the female connector 102 in FIG. 2B, taken to the left along line A-A, viewed in the direction of the arrow, and FIG. 4B is a cross-sectional view of the female connector 102 in FIG. 2B, taken down along line B-B, as viewed in the direction of the arrow, i.e., the radial cross-section of the female connector 102 at the mounting position of the clip 220. FIGS. 4A and 4B show the assembly relationship between components of the female connector 102 after the components are assembled in place. In FIGS. 4A and 4B, although the male connector 104 has not been inserted into the female connector 102, the clip 220 has already been in the locked position thereof.

As shown in FIG. 4A, the support ring 240, the sealing ring 250, the additional support ring 260 and the additional sealing ring 270 are inserted from the receiving end 113 into the female connector housing 110 in the insertion direction shown by narrow A. The female connector housing 110 is provided with two steps 401, 402 on the inner wall of the fluid channel 111 (i.e., the first pipe section 211) at the receiving end 113, and the additional sealing ring 270 and the additional support ring 260 respectively abut against the two steps 401 and 402. In the axial direction of the first pipe section 211 of the female connector housing 110, the additional sealing ring 270 is located at the inner side of the additional support ring 260, the additional support ring 260 can restrict the additional sealing ring 270 to move in a direction opposite the insertion direction shown by the narrow A, and the two steps 401 and 402 respectively restrict the additional sealing ring 270 and the additional support ring 260 to further move in the insertion direction shown by the narrow A. The support ring 240 is mounted in the first pipe section 211 of the female connector housing 110, with the inner end 327 of the support ring 240 facing the sealing ring 250, and the end face of the outer end 325 thereof being substantially flush with the end face of the receiving end 113 of the female connector housing 110. The sealing ring 250 is arranged between the support ring 240 and the additional support ring 260, and the cooperation of the support ring 240 and the additional support ring 260 can restrict the sealing ring 250 to move in the axial direction of the female connector housing 110. In FIG. 4A, the window 319 at the top of the support ring 240, and the mounting member connection end 320 and the mounting member free end 321 of the mounting member 245 can be seen.

As shown in FIGS. 4A and 4B, when the support ring 240 is mounted in place in the fluid channel 111 of the female connector housing 110, the pair of support ring openings 247 are respectively aligned with the pair of housing openings 215. The widths of the support ring opening 247 and the housing opening 215 are substantially the same, and both match the diameters of the clip legs 222. The two housing openings 215 have the same size and shape, and are symmetrically arranged on the left and right sides of the female connector housing 110; and the two support ring openings 247 have the same size and shape, and are symmetrically arranged on the left and right sides of the support ring 240. A pair of support ring openings 247 are respectively located at the inner sides of the pair of housing openings 215. One support ring opening 247 and one housing opening 215, which are located on the same side of the female connector 102, are aligned with each other, and extend in the same direction.

With the above cooperation of the support ring 240 and the female connector housing 110, when the clip 220 is mounted in place in the female connector 102 and thus in the locked position thereof, the pair of clip legs 222 of the clip 220 can be inserted into the pair of housing openings 215 and the pair of support ring openings 247 at the same time, and the pair of clip legs 222 can also enter the internal space of the support ring 240. When the clip 220 is in the locked position thereof, the feet 228 (the distal ends 224) of the clip legs 222 extend out of the female connector housing 110, and are partially accommodated in the pair of clip mounting slots 219 in the outer surface of the female connector housing 110. The feet 228 of the clip legs 222 are provided such that the distal ends 224 of the clip legs 222 can be held outside the female connector housing 110, and the clip mounting slots 219 are provided such that the extent to which the two clip legs 222 of the clip 220 open relative to each other can be restricted by means of the cooperation of the feet 228 of the clip 220 and the clip mounting slots 219. As a result, the clip 220 can be better hold on the female connector housing 110.

As shown in FIG. 4B, when the clip 220 is in the locked position in the female connector 102, the outer edge of the operation portion 223 is substantially flush with the outer edge of the mounting indication plate 216, the operation portion 223 is located at the travel end position 405, and even if an operator continue to press the operation portion 223 downwards, the operation portion 223 cannot move downwards. Generally, the operator observes whether the operation portion 223 of the clip 220 is in the travel end position 405 so as to determine whether the clip 220 is mounted in the locked position. When the user finds that the outer edge of the operation portion 223 of the clip 220 protrudes from the outer edge of the mounting indication plates 216, i.e., the operation portion 223 is not in the travel end position 405, the operator will determine that the clip 220 is not mounted in place in the female connector 102 and is not in the locked position. It can be seen therefrom that the operator can determine whether the clip 220 is mounted in place on the female connector housing 110 according to the relative positions of the operation portions 223 of the clip 220 and the pair of mounting indication plates 216. When the clip 220 is mounted in place on the female connector housing 110 and thus in the locked position, there is a first predetermined distance 408 between the distal ends 224 of the two clip legs 222. The first predetermined distance 408 is less than the diameter of the fluid channel 111 at the receiving end 113 of the female connector housing 110.

As still shown in FIG. 4B, on the radial face of the female connector housing 110, the circle formed by the arc-shaped blocking faces 302 of the pair of blocking portions 330 of the blocking member 230 and the circle where the outer surface of the female connector housing 110 is located are concentric circles. That is, the pair of blocking faces 302 are parallel to the outer surface of the cylindrical female connector housing 110. There is a constant distance between the pair of blocking faces 302 and the outer surface of the female connector housing 110, which is recorded as a second predetermined distance 409. When the clip 220 is mounted in place in the female connector housing 110 as shown in FIG. 4B, the distal ends 224 of the pair of clip legs 222 extend out of the outer surface of the female connector housing 110, the two distal ends 224 are accommodated in the space between the pair of blocking faces 302 and the outer surface of the female connector housing 110, and the second predetermined distance 409 is determined according to the length of the distal ends 224 of the pair of clip legs 222 protruding from the outer surface of the female connector housing 110 when the clip 220 is mounted in place. In this embodiment, the second predetermined distance 409 is configured such that when the clip 220 is mounted in place, the distal ends 224 of the pair of clip legs 222 are just in contact with the blocking faces 302 of the pair of blocking members 230. With the above arrangement, during the fixed connection of the male connector 104 and the female connector 102 using the clip 220, the clip blocking member 230 on the female connector 102 can define the motion path of the clip 220, so as to avoid the misassembly between the male connector 104 and the female connector 102, which will be described in detail below.

When the components of the female connector 102 are assembled into the assembled state as shown in FIGS. 4A and 4B, at first, the additional sealing ring 270, the additional support ring 260, the sealing ring 250 and the support ring 240 are sequentially inserted from the receiving end 113 into the female connector housing 110 in the insertion direction shown by the narrow A. After the components reach the position shown in FIG. 4A the clip 220 is deployed, the pair of clip legs 222 are pulled away from each other, such that the distance between the pair of clip legs 222 increases until the clip 220 can be arranged across the female connector housing 110, and the pair of clip legs 222 are aligned with the two housing openings 215 of the female connector housing 110. Next, the pair of clip legs 222 are released, such that the pair of clip legs 222 respectively enter the two housing openings 215, and the two feet 228 are held outside the female connector housing 110. Then, the operation portion 223 reaches the travel end position 405.

Figure 5A:
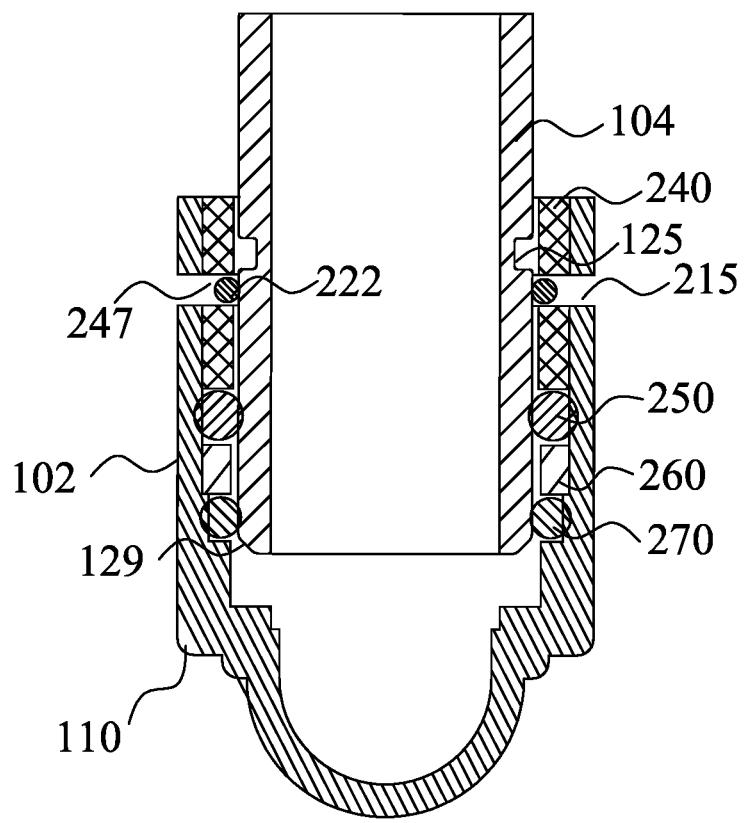
FIG. 5A is a cross-sectional view of the connector assembly in FIG. 1A in an axial direction of a female connector housing when a male connector is not mounted in place.
Figure 5B:
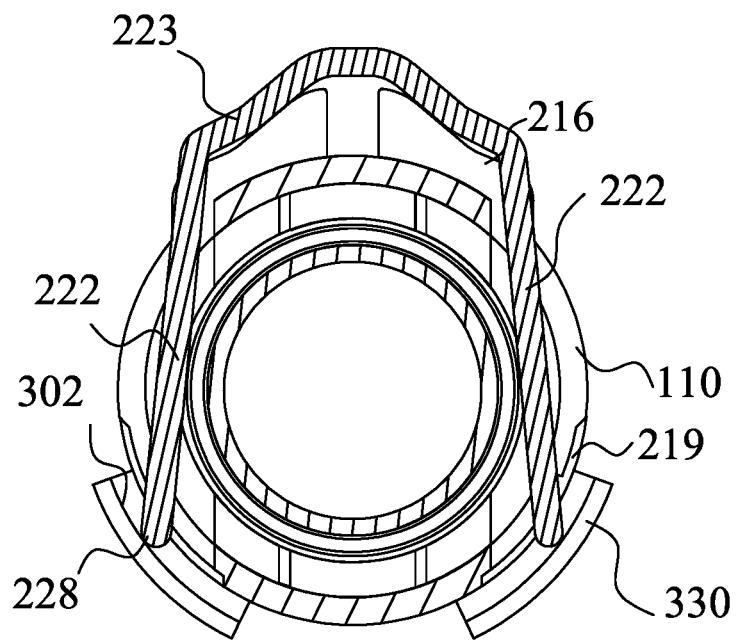
FIG. 5B is a cross-sectional view of the connector assembly in FIG. 1A in a radial direction of the female connector housing when the male connector is not mounted in place.

FIG. 5A is a cross-sectional view of the connector assembly 100 in FIG. 1A in the axial direction of the female connector housing 110 when the male connector 104 is not mounted in place, with the cutaway position the same as that in FIG. 4A. FIG. 5B is a cross-sectional view of the connector assembly 100 in FIG. 1A in the radial direction of the female connector housing 110 when the male connector 104 is not mounted in place, with the cutaway position the same as that in FIG. 4B. In FIGS. 5A and 5B, when the male connector 104 has not been inserted in place in the female connector 102, the clip 220 also has not been mounted in place, and at this time, the clip 220 is not in the locked position.

Before the male connector 104 is inserted into the female connector 102, the clip 220 is mounted in place in the female connector 102 as shown in FIG. 4A and is in the locked position. Since the two clip legs 222 of the clip 220 enter the internal space of the support ring 240, the distance between the two clip legs 222 is less than the inner diameter of the support ring 240 and thus also less than the outer diameter of the male connector 104. After the male connector 104 enters the support ring 240, the inclined guide face 129 of the male connector 104 first enter the space between the two clip legs 222. Since the diameter of the guide face 129 gradually increases, as the male connector 104 gradually moves inwards, the guide face 129 pushes the two clip legs 222 away from each other, such that the male connector 104 can enter the space between the two clip legs 222. In this process, the clip legs 222 exit the internal space of the support ring 240, and the distance between the two feet 228 is greater than the first predetermined distance 408 shown in FIG. 4B. Also, the inner surfaces of the two clip legs 222 abut against the outer surface of the male connector 104. As shown in FIG. 5A, as the two clip legs 222 of the clip 220 expend outwards, the feet 228 of the two clip legs 222 will move upwards in the pair of clip mounting slots 219, and the clip blocking members 230 (comprising the blocking portions 330) arranged at the outer side of the female connector housing 110 can also prevent the feet 228 of the two clip legs 222 from moving downwards. At this time, even if the operation portion 223 of the clip 220 is pressed downwards, since the pair of feet 228 of the clip 220 abut against the pair of blocking faces 302 of the clip blocking members 230, the operation portion 223 will not move downwards until it is fully accommodated in the accommodation space formed by the pair of mounting indication plates 216, and thus the operation portion 223 protrudes from the outer edge of the mounting indication plates 216, such that the user can see the clip 220 is not mounted in place according to the position of the operation portion 223 relative to the mounting indication plates 216. However, if the blocking portion 330 is not provided, when the clip 220 is in the state shown in FIG. 5B, the operation portion 223 of the clip 220 is pressed downwards, and the operation portion 223 will move downwards until it is fully accommodated in the accommodation space formed by the pair of mounting indication plates 216 and reaches the travel end position 405. Therefore, the clip blocking member 230 is provided to avoid the occurrence of the case where the clip 220 is not mounted in place while the operation portion 223 of the clip 220 has reached the travel end position 405 in the mounting process.

As the male connector 104 continues to move inwards to enter the fluid channel 111 of the female connector 102, the sealing ring 250 and the additional sealing ring 270 sequentially abut against the outer surface of the male connector 104, so as to achieve the sealing connection between the male connector 104 and the female connector 102. When the groove 125 of the male connector 104 is aligned with the pair of clip legs 222 of the clip 220, the pair of clip legs 222 are retracted relative to each other so as to be snap-fitted into the groove 125 of the male connector 104. At this time, the clip 220 is mounted in place in the female connector housing 110, and returns to the locked position.

Figure 6A:
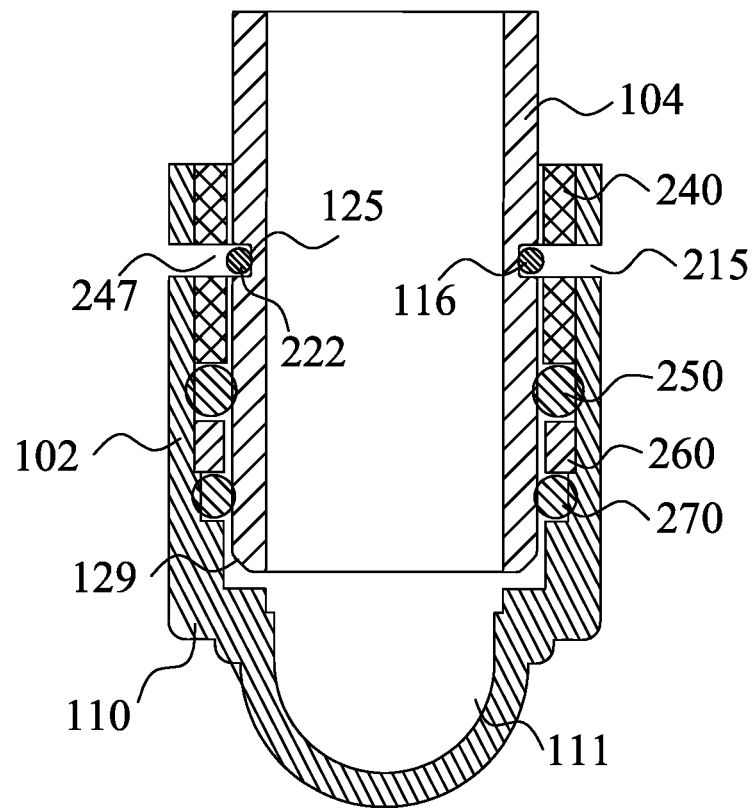
FIG. 6A is a cross-sectional view of the connector assembly in FIG. 1A in the axial direction of the female connector housing when the male connector is mounted in place.
Figure 6B:
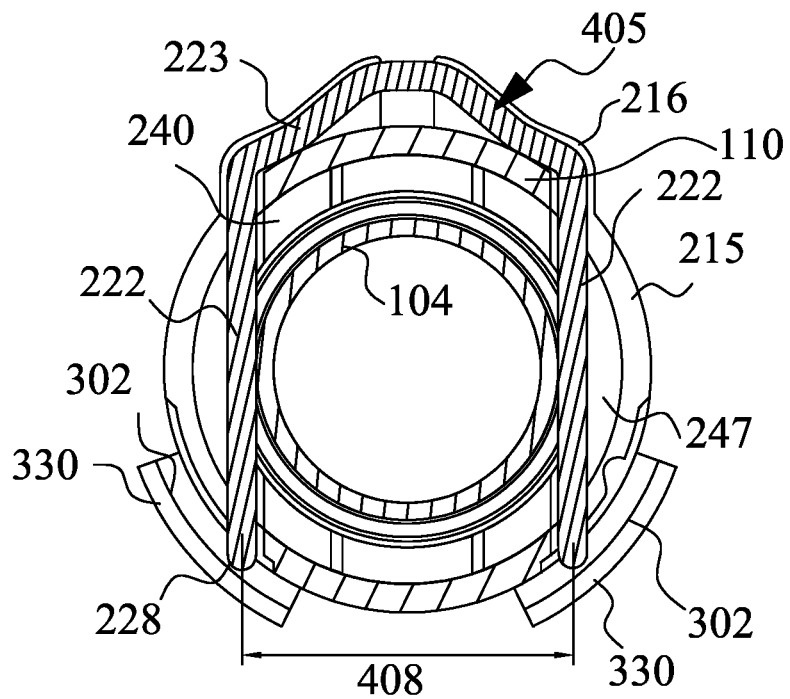
FIG. 6B is a cross-sectional view of the connector assembly in FIG. 1A in the radial direction of the female connector housing when the male connector is mounted in place.

FIG. 6A is a cross-sectional view of the connector assembly 100 in FIG. 1A in the axial direction when the male connector 104 is mounted in place, with the cutaway position the same as that in FIG. 4A; and FIG. 6B is a cross-sectional view of the connector assembly 100 in FIG. 1A in the radial direction when the male connector 104 is mounted in place, with the cutaway position the same as that in FIG. 4B. As shown in FIGS. 6A and 6B, when the male connector 104 is mounted in place in the female connector 102, the groove 125 of the male connector 104 is aligned with the pair of housing openings 215 and the pair of support ring openings 247 of the female connector 102, such that the pair of clip legs 222 of the clip 220 are inserted into the groove 125 of the male connector 104. At this time, the distance between the distal ends 224 of the pair of clip legs 222 returns to the first predetermined distance 408, and the operation portion 223 of the clip 220 returns to the travel end position 405. Since the support ring 240 is fixedly connected at the receiving end 113 of the female connector 102, and therefore, when the clip 220 is mounted in place in the connector assembly 100 and thus in the locked position, the clip 220 can prevent the relative movement of the male connector 104 and the female connector 102 in the axial direction, so as to lock the male connector 104 with respect to the female connector 102. In addition, the sealing ring 250 and the additional sealing ring 270 are provided such that the male connector 104 is arranged with fitting into the female connector 102 in the radial direction. Therefore, when the clip 220 is mounted in place in the connector assembly 100, the male connector 104 and the female connector 102 are connected together in a fixed and sealing manner, so as to ensure the effective communication of the fluid in the connector assembly 100.

Since during the insertion of the male connector 104 into the female connector 102, the operator cannot observe the groove 125 of the male connector 104 that is located in the female connector 102, and thus cannot determine whether the male connector 104 is inserted in place in the female connector 102 by means of observing whether the groove 125 of the male connector 104 is aligned with the pair of housing openings 215 and the pair of support ring openings 247 of the female connector 102. The operator can only determine whether the operation portion 223 of the clip 220 can get into the travel end position 405 so as to determine whether the male connector 104 is inserted in place in the female connector 102. The clip blocking member 230 of the present disclosure can provide reasonable guide of motion path for the distal ends 224 of the pair of clip legs 222 of the clip 220, such that only when the groove 125 of the male connector 104 is aligned with the pair of housing openings 215 and the pair of support ring openings 247 of the female connector 102, the operation portion 223 of the clip 220 can get into the travel end position 405, whereas when the groove 125 of the male connector 104 is not aligned with the pair of housing openings 215 and the pair of support ring openings 247 of the female connector 102, even if the operation portion 223 of the clip 220 is pressed downwards (for example, due to misoperation), the operation portion 223 of the clip 220 cannot get into the travel end position 405. As a result, the case where the operation portion 223 of the clip 220 gets into the travel end position 405 when the male connector 104 has not be inserted in place in the female connector 102 can be prevented, so as to prevent the operator from determining by mistake that male connector 104 has been mounted in place in the female connector 102 according to the operation portion 223 getting into the travel end position 405.

In conjunction with FIGS. 5B and 6B, it can be seen that during the insertion of the male connector 104 into the female connector 102, the clip blocking members 230 located at the outer sides of the distal ends 224 of the pair of clip legs 222 do not affect the relative movement of the pair of clip legs 222 of the clip 220, and thus not affect the operation of connecting the male connector 104 to the female connector 102.

Although only some features of the present disclosure are illustrated and described herein, those skilled in the art would be able to make various improvements and changes. Therefore, it should be understood that the appended claims are intended to encompass all the above improvements and changes that fall within the substantial spirit and scope of the present disclosure.

The invention claimed is:

1. A female connector for receiving a male connector, the male connector comprising a first outer surface and a groove that is recessed inwards from the outer surface and extends in a circumferential direction, the female connector comprising:
a female connector housing with a second outer surface defining a fluid channel that extends in an axial direction thereof and comprising a pair of housing openings, the pair of housing openings extending in a circumferential direction of the female connector housing and being in communication with the fluid channel;
a support ring comprising a pair of support ring openings, the pair of support ring openings extending in a circumferential direction of the support ring and being in communication with an internal space of the support ring, the support ring being arranged in the fluid channel of the female connector housing, and the pair of support ring openings being respectively aligned with the pair of housing openings;
a clip comprising a pair of clip legs and an operation portion connected between proximal ends of the pair of clip legs, and the pair of clip legs being configured to respectively pass through the pair of housing openings and enter the pair of support ring openings; and
a clip blocking member being located outside the female connector housing, and having a pair of blocking faces which respectively face distal ends of the pair of clip legs of the clip,
wherein the male connector is capable of being at least partially inserted into the internal space of the support ring located in the fluid channel of the female connector, and wherein when the groove of the male connector is aligned with the pair of housing openings and the pair of support ring openings, the pair of clip legs enter the groove, and the operation portion of the clip is capable of getting into a travel end position;
wherein the pair of blocking faces are configured such that, when the groove is not aligned with the pair of housing openings and the pair of support ring openings, and the pair of clip legs abut against the first outer surface of the male connector, the pair of blocking faces prevent the operation portion from getting into the travel end position by abutting against the distal ends of the pair of clip legs; and
wherein when the operation portion is in the travel end position, the distal ends of the pair of clip legs are between the pair of blocking faces and the second outer surface.

2. The female connector according to claim 1, wherein when the operation portion reaches the travel end position, the clip locks the male connector with respect to the female connector and the clip is in a locked position.

3. The female connector according to claim 2, wherein the second outer surface of the female connector housing is provided with a mounting indicator, and the position of the operation portion with respect to the mounting indicator indicates when the mounting indicator has reached the travel end position.

4. The female connector according to claim 2, wherein, when the clip is in the locked position, there is a first predetermined distance between the distal ends of the pair of clip legs, and the pair of blocking faces are configured such that, when the distance between the distal ends of the pair of clip legs is greater than the first predetermined distance, the pair of blocking faces are capable of abutting against the distal ends of the pair of clip legs so as to prevent the operation portion of the clip from reaching the travel end position.

5. The female connector according to claim 1, wherein the clip blocking member is connected to the support ring, and the pair of blocking faces are spaced from the second outer surface of the female connector housing to accommodate the distal ends of the pair of clip legs.

6. The female connector according to claim 5, wherein the female connector housing is cylindrical, the pair of blocking faces are arc faces parallel to the second outer surface of the female connector housing, there is a second predetermined distance between the pair of blocking faces and the second outer surface of the female connector housing, and the second predetermined distance is determined according to a length of the distal ends of the pair of clip legs extending from the second outer surface of the female connector housing when the clip is in a locked position.

7. The female connector according to claim 6, wherein the clip blocking member comprises a pair of blocking portions, and the pair of blocking faces are respectively formed on the pair of blocking portions.

8. The female connector according to claim 7, wherein the pair of blocking portions respectively comprise an arc-shaped blocking plate that is arranged concentrically with the female connector housing, and the pair of blocking faces are formed by the blocking plates.

9. The female connector according to claim 1, wherein the distal ends of the pair of clip legs respectively form a foot, and the feet are configured to hold the distal ends of the pair of clip legs outside the female connector housing.

10. The female connector according to claim 1, wherein the female connector further comprises a sealing ring, wherein the sealing ring is arranged in the fluid channel of the female connector housing and is located at an inner side of the support ring in the axial direction of the female connector housing, the sealing ring is configured such that the male connector is connected to the female connector in a sealing manner, and the support ring is configured to hold the sealing ring in the fluid channel.

11. A female connector for receiving a male connector, the male connector comprising a first outer surface and a groove that is recessed inwards from the first outer surface and extends in a circumferential direction, the female connector comprising:
  a female connector housing defining a fluid channel that extends in an axial direction thereof and comprising a pair of housing openings, the pair of housing openings extending in a circumferential direction of the female connector housing and being in communication with the fluid channel;
  a support ring comprising a pair of support ring openings, the pair of support ring openings extending in a circumferential direction of the support ring and being in communication with an internal space of the support ring, the support ring being arranged in the fluid channel of the female connector housing, and the pair of support ring openings being respectively aligned with the pair of housing openings;
  a clip comprising a pair of clip legs and an operation portion connected between proximal ends of the pair of clip legs, and the pair of clip legs being configured to respectively pass through the pair of housing openings and enter the pair of support ring openings; and
  a clip blocking member being located outside the female connector housing, and having a pair of blocking faces which respectively face distal ends of the pair of clip legs of the clip, wherein the clip blocking member is connected to the support ring, and the pair of blocking faces are spaced from a second outer surface of the female connector housing to accommodate the distal ends of the pair of clip legs,
  wherein the male connector is capable of being at least partially inserted into the internal space of the support ring located in the fluid channel of the female connector, and wherein when the groove of the male connector is aligned with the pair of housing openings and the pair of support ring openings, the pair of clip legs enter the groove, and the operation portion of the clip is capable of getting into a travel end position; and
  wherein the pair of blocking faces are configured such that, when the groove is not aligned with the pair of housing openings and the pair of support ring openings, and the pair of clip legs abut against the first outer surface of the male connector, the pair of blocking faces prevent the operation portion from getting into the travel end position by abutting against the distal ends of the pair of clip legs.

12. The female connector according to claim 11, wherein when the operation portion reaches the travel end position, the clip locks the male connector with respect to the female connector and the clip is in a locked position.

13. The female connector according to claim 12, wherein the second outer surface of the female connector housing is provided with a mounting indicator, and the position of the operation portion with respect to the mounting indicator indicates when the mounting indicator has reached the travel end position.

14. The female connector according to claim 12, wherein, when the clip is in the locked position, there is a first predetermined distance between the distal ends of the pair of clip legs, and the pair of blocking faces are configured such that, when the distance between the distal ends of the pair of clip legs is greater than the first predetermined distance, the pair of blocking faces are capable of abutting against the distal ends of the pair of clip legs so as to prevent the operation portion of the clip from reaching the travel end position.

15. The female connector according to claim 11, wherein the female connector housing is cylindrical, the pair of blocking faces are arc faces parallel to the second outer surface of the female connector housing, there is a second predetermined distance between the pair of blocking faces and the second outer surface of the female connector housing, and the second predetermined distance is determined according to a length of the distal ends of the pair of clip legs extending from the second outer surface of the female connector housing when the clip is in a locked position.

16. The female connector according to claim 15, wherein the clip blocking member comprises a pair of blocking portions, and the pair of blocking faces are respectively formed on the pair of blocking portions.

17. The female connector according to claim 16, wherein the pair of blocking portions respectively comprise an arc-shaped blocking plate that is arranged concentrically with the female connector housing, and the pair of blocking faces are formed by the blocking plates.

18. The female connector according to claim 11, wherein the distal ends of the pair of clip legs respectively form a foot, and the feet are configured to hold the distal ends of the pair of clip legs outside the female connector housing.

19. The female connector according to claim 11, wherein the female connector further comprises a sealing ring, wherein the sealing ring is arranged in the fluid channel of the female connector housing and is located at an inner side of the support ring in the axial direction of the female connector housing, the sealing ring is configured such that the male connector is connected to the female connector in a sealing manner, and the support ring is configured to hold the sealing ring in the fluid channel.

20. A connector assembly, comprising:
- a male connector comprising a first outer surface and a groove that is recessed inwards from the first outer surface and extends in the circumferential direction; and
- a female connector according to claim 11.

* * * * *